(12) United States Patent
Moniz et al.

(10) Patent No.: US 10,738,791 B2
(45) Date of Patent: Aug. 11, 2020

(54) ACTIVE HIGH PRESSURE COMPRESSOR CLEARANCE CONTROL

(71) Applicant: General Electric Company, Schnectady, NY (US)

(72) Inventors: Thomas Ory Moniz, Loveland, OH (US); Joseph George Rose, Mason, OH (US)

(73) Assignee: General Electric Company, Schenectady, NY (US)

(*) Notice: Subject to any disclaimer, the term of this patent is extended or adjusted under 35 U.S.C. 154(b) by 812 days.

(21) Appl. No.: 14/970,968

(22) Filed: Dec. 16, 2015

(65) Prior Publication Data
US 2017/0175751 A1  Jun. 22, 2017

(51) Int. Cl.
| | | |
|---|---|---|
| F04D 27/00 | (2006.01) | |
| F01D 11/24 | (2006.01) | |
| F01D 25/12 | (2006.01) | |
| F02C 7/12 | (2006.01) | |
| F02C 6/08 | (2006.01) | |
| F04D 29/32 | (2006.01) | |

(Continued)

(52) U.S. Cl.
CPC .......... *F04D 27/006* (2013.01); *F01D 11/24* (2013.01); *F01D 25/12* (2013.01); *F02C 6/08* (2013.01); *F02C 7/12* (2013.01); *F04D 29/321* (2013.01); *F04D 29/522* (2013.01); *F04D 29/542* (2013.01); *F04D 29/582* (2013.01); *F05D 2220/32* (2013.01); *F05D 2230/60* (2013.01); *F05D 2240/12* (2013.01); *F05D 2240/24* (2013.01); *F05D 2260/20* (2013.01)

(58) Field of Classification Search
CPC ........................................................ F01D 11/24
See application file for complete search history.

(56) References Cited

U.S. PATENT DOCUMENTS 4,363,599 A * 12/1982 Cline ...................... F01D 11/18
                                                                                                415/136
4,683,716 A *  8/1987 Wright ................... F01D 11/22
                                                                                                415/127

(Continued)

FOREIGN PATENT DOCUMENTS

| CN | 1854468 A | 11/2006 |
|---|---|---|
| CN | 102482947 A | 5/2012 |

(Continued)

OTHER PUBLICATIONS

Extended European Search Report and Opinion issued in connection with corresponding EP Application No. 16203216.3 dated Apr. 12, 2017.

(Continued)

*Primary Examiner* — Christopher Verdier
*Assistant Examiner* — Jason A Fountain
(74) *Attorney, Agent, or Firm* — Dority & Manning, P.A.

(57) ABSTRACT

In one embodiment, a compressor clearance control system is provided. The compressor clearance control system includes a cooling air source, a compressor casing, and a cooling air flowpath defined through the compressor casing. The flowpath includes an inlet configured to receive cooling air from the cooling air source and an outlet configured to exhaust the cooling air to the cooling air source such that the flowpath defines a closed loop within the compressor.

20 Claims, 4 Drawing Sheets

(51) Int. Cl.
*F04D 29/52* (2006.01)
*F04D 29/54* (2006.01)
*F04D 29/58* (2006.01)

(56) References Cited

U.S. PATENT DOCUMENTS

| | | | |
|---|---|---|---|
| 5,116,199 A * | 5/1992 | Ciokajlo | F01D 11/24 415/116 |
| 5,205,115 A | 4/1993 | Plemmons et al. | |
| 5,593,274 A | 1/1997 | Carreno et al. | |
| 5,779,436 A | 7/1998 | Glezer et al. | |
| 6,116,018 A | 9/2000 | Tanimura et al. | |
| 6,672,074 B2 | 1/2004 | Tiemann | |
| 7,434,402 B2 * | 10/2008 | Paprotna | F01D 11/24 415/115 |
| 7,766,611 B2 | 8/2010 | Buchal et al. | |
| 8,092,146 B2 * | 1/2012 | Legare | F01D 11/24 415/1 |
| 8,434,997 B2 | 5/2013 | Pinero et al. | |
| 8,992,168 B2 | 3/2015 | Norris et al. | |
| 9,316,111 B2 * | 4/2016 | Eleftheriou | F01D 11/20 |
| 9,816,438 B2 * | 11/2017 | Teia Dos Santos Medes Gomes | F01D 11/24 |
| 10,302,015 B2 * | 5/2019 | Ribarov | F01D 25/12 |
| 2006/0225430 A1 | 10/2006 | Paprotna et al. | |
| 2010/0247297 A1 * | 9/2010 | Legare | F01D 11/24 415/173.1 |
| 2012/0167588 A1 | 7/2012 | Dierksmeier et al. | |
| 2013/0156541 A1 * | 6/2013 | Eleftheriou | F01D 11/20 415/1 |
| 2014/0314548 A1 * | 10/2014 | Rivers | F01D 9/042 415/145 |
| 2015/0037133 A1 | 2/2015 | Casavant et al. | |
| 2015/0260101 A1 * | 9/2015 | Teia Dos Santos Medes Gomes | F01D 11/24 60/39.091 |
| 2016/0003082 A1 * | 1/2016 | Lutjen | F01D 11/08 415/116 |

FOREIGN PATENT DOCUMENTS

| | | |
|---|---|---|
| CN | 103471415 A | 12/2013 |
| DE | 10 2005 045 255 A1 | 3/2007 |
| DE | 10 2005 045255 A1 | 3/2007 |
| EP | 2 604 807 A2 | 6/2013 |
| EP | 2 905 538 A1 | 8/2015 |
| WO | 2007/033649 A1 | 3/2007 |
| WO | 2014158600 A1 | 10/2014 |

OTHER PUBLICATIONS

First Office action and Search issued in connection with corresponding CN Application No. 201611167950.9 dated Mar. 21, 2018.
Second Office Action and Search issued in connection with corresponding CN Application No. 201611167950.9 dated Dec. 4, 2018 (English Translation Not Available).

* cited by examiner

ACTIVE HIGH PRESSURE COMPRESSOR CLEARANCE CONTROL

BACKGROUND

The field of the disclosure relates generally to gas turbine engines and, more particularly, to a method and system for controlling compressor clearance at various stages of flight using active cooling of the compressor case.

Gas turbine engines typically include multiple compressor stages to compress incoming airflow for delivery to the combustor. The rotor blades and compressor casing are subjected to a range of temperatures during various stages of operation such as ground operation, takeoff, and cruise resulting in thermal expansion or contraction of these compressor components. Typically, the components of the compressor stages are designed to operate with minimal compressor clearance to enhance thrust production during takeoff. However, during cruise conditions, operating temperatures of the compressor stages are higher than at takeoff, resulting in larger compressor clearances due to thermal expansion of the compressor components. Larger compressor clearances degrade the efficiency of operation of the gas turbine engine at cruise conditions. A reduction in compressor clearance at cruise conditions, without impacting the operation of the gas turbine engine at takeoff conditions, can enhance fuel efficiency of the gas turbine engine during cruise conditions with minimal impact on thrust production at takeoff conditions.

BRIEF DESCRIPTION

In one embodiment, a compressor clearance control system is provided. The compressor clearance control system includes a cooling air source, a compressor casing, and a cooling air flowpath defined through the compressor casing. The flowpath includes an inlet configured to receive cooling air from the cooling air source and an outlet configured to exhaust the cooling air such that the flowpath defines a closed loop within the compressor.

In another embodiment, a gas turbine engine is provided. The gas turbine engine includes a rotating component and a stationary component positioned radially outward from the rotating component to define a primary flowpath therebetween. The gas turbine engine also includes a cooling air source and a cooling air flowpath defined through the stationary component. The cooling air flowpath is positioned proximate the primary flowpath and is configured to channel cooling air from the cooling air source therethrough to facilitate cooling the stationary component.

In yet another embodiment, a method of assembling a gas turbine engine is provided. The method includes coupling a stationary component radially outward from a rotating component to define a primary flowpath therebetween. A cooling air source is coupled in flow communication with the stationary component. The method also includes forming a cooling air flowpath in the stationary component proximate the primary flowpath and coupling the cooling air source in flow communication with the cooling air flowpath to channel cooling air through the flowpath to facilitate cooling the stationary component. The cooling air source and the cooling air flowpath define a closed loop within the compressor.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
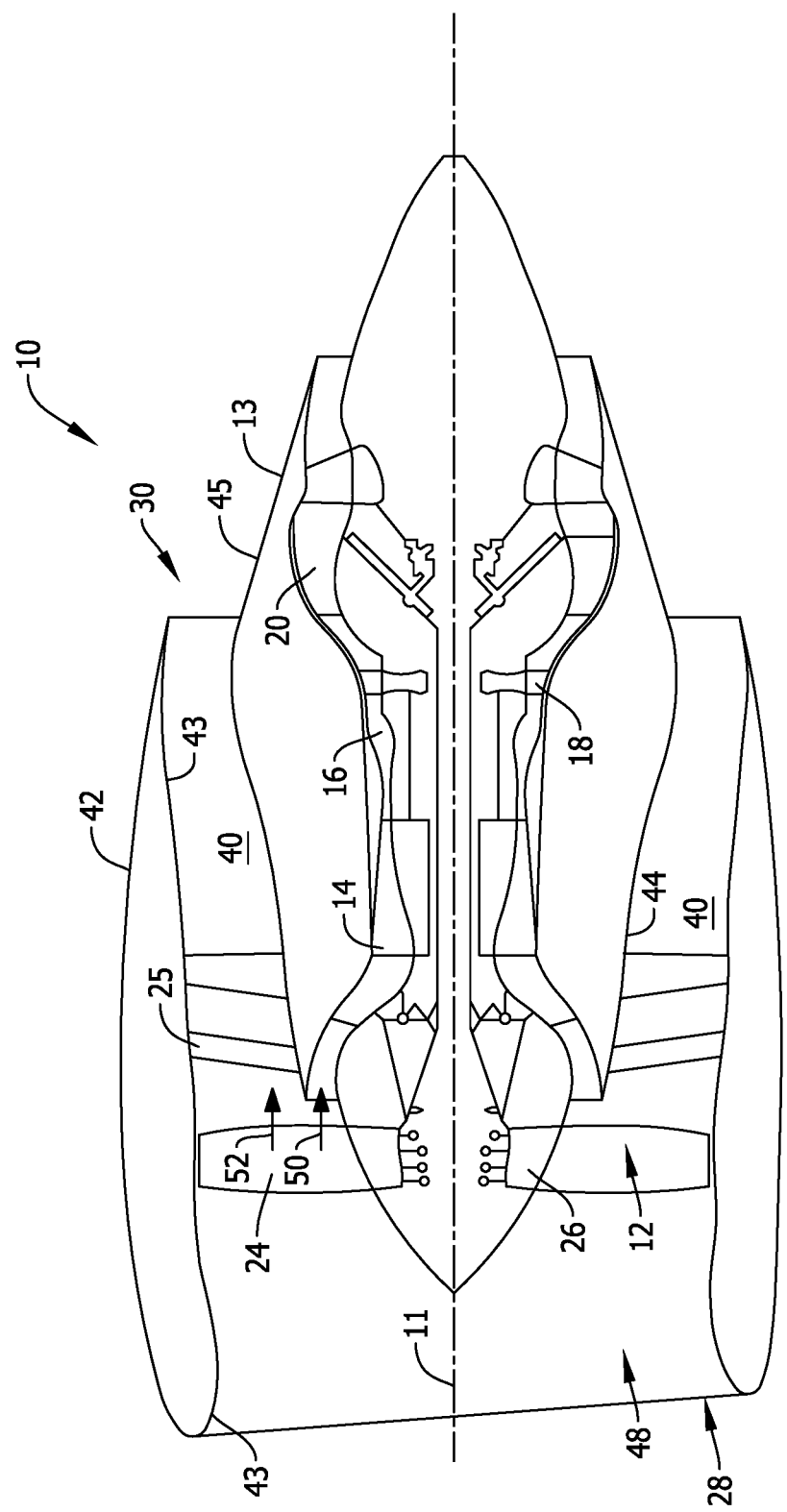
FIG. 1 is a schematic view of an exemplary gas turbine engine.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The following detailed description illustrates embodiments of the disclosure by way of example and not by way of limitation. It is contemplated that the disclosure has general application to a method and system for cooling a stationary member of a body that includes the stationary member as well as a rotating member that rotates about a rotation axis within a duct formed within the stationary member. In one exemplary embodiment, the body is a gas turbine engine, the stationary member is a compressor casing of a compressor of the gas turbine engine, and the rotating member is a rotor assembly that rotates about the rotation axis within a duct formed within the compressor casing. Although various embodiments of the gas turbine engine clearance control system and methods of cooling a stationary member of a body are described in terms of this exemplary embodiment, it is to be understood that the gas turbine engine clearance control system and methods are suitable for cooling the stationary member of any body as defined herein without limitation.

Embodiments of a compressor clearance control system described herein direct cooling air through an air passage formed within at least one compressor casing of a compressor of a gas turbine engine. The compressor clearance control system includes a cooling air source, a compressor casing, and a cooling air flowpath defined through the compressor casing. The flowpath includes an inlet configured to receive cooling air from the cooling air source and an outlet configured to exhaust the cooling air to the cooling air source or another location in the compressor such that the flowpath defines a closed loop within the compressor.

The compressor clearance control system described herein offers advantages over known methods of cooling components of the compressor of a gas turbine engine. More specifically, the compressor clearance control system prevents or reduces thermal expansion of the compressor casing to maintain a minimum clearance between the compressor casing and a rotor blade tip. In operation, as air travels along a primary flowpath through the compressor, and increases in pressure, it also increases in temperature. At least a portion of the thermal energy is transferred to the compressor casing, which may cause the casing to undergo thermal expansion. If no action is taken, the thermal expansion of casing results in an increase in the size of gap between the rotor blade tip and the radially inner surface of the casing, which reduces the efficiency of the engine. The compressor clearance control system described herein channels a cooling airflow along a flowpath defined in a radially inner portion of the casing to facilitate cooling the casing and minimizing or preventing thermal expansion, which increases the efficiency of the engine.

FIG. 1 is a schematic illustration of an exemplary gas turbine engine assembly 10 having a longitudinal axis 11. Gas turbine engine assembly 10 includes a fan assembly 12, and a core gas turbine engine 13. Core gas turbine engine 13 includes a high pressure compressor 14, a combustor 16, and a high pressure turbine 18. In the exemplary embodiment, gas turbine engine assembly 10 may also include a low pressure turbine 20. Fan assembly 12 includes an array of fan blades 24 extending radially outward from a rotor disk 26. Engine 10 has an intake side 28 and an exhaust side 30. Gas turbine engine assembly 10 also includes a plurality of bearing assemblies (not shown in FIG. 1) that are utilized to provide rotational and axial support to fan assembly 12, compressor 14, high pressure turbine 18 and low pressure turbine 20, for example.

In operation, an inlet airflow 48 flows through fan assembly 12 and is split by an airflow splitter 44 into a first portion 50 and a second portion 52. First portion 50 of the airflow is channeled through compressor 14 wherein the airflow is further compressed and delivered to combustor 16. Hot products of combustion (not shown in FIG. 1) from combustor 16 are utilized to drive turbines 18 and 20 and thus produce engine thrust. Gas turbine engine assembly 10 also includes a bypass duct 40 that is utilized to bypass a second portion 52 of the airflow discharged from fan assembly 12 around core gas turbine engine 13. More specifically, bypass duct 40 extends between an inner wall 43 of a fan casing or shroud 42 and an outer wall 45 of splitter 44.

Figure 2:
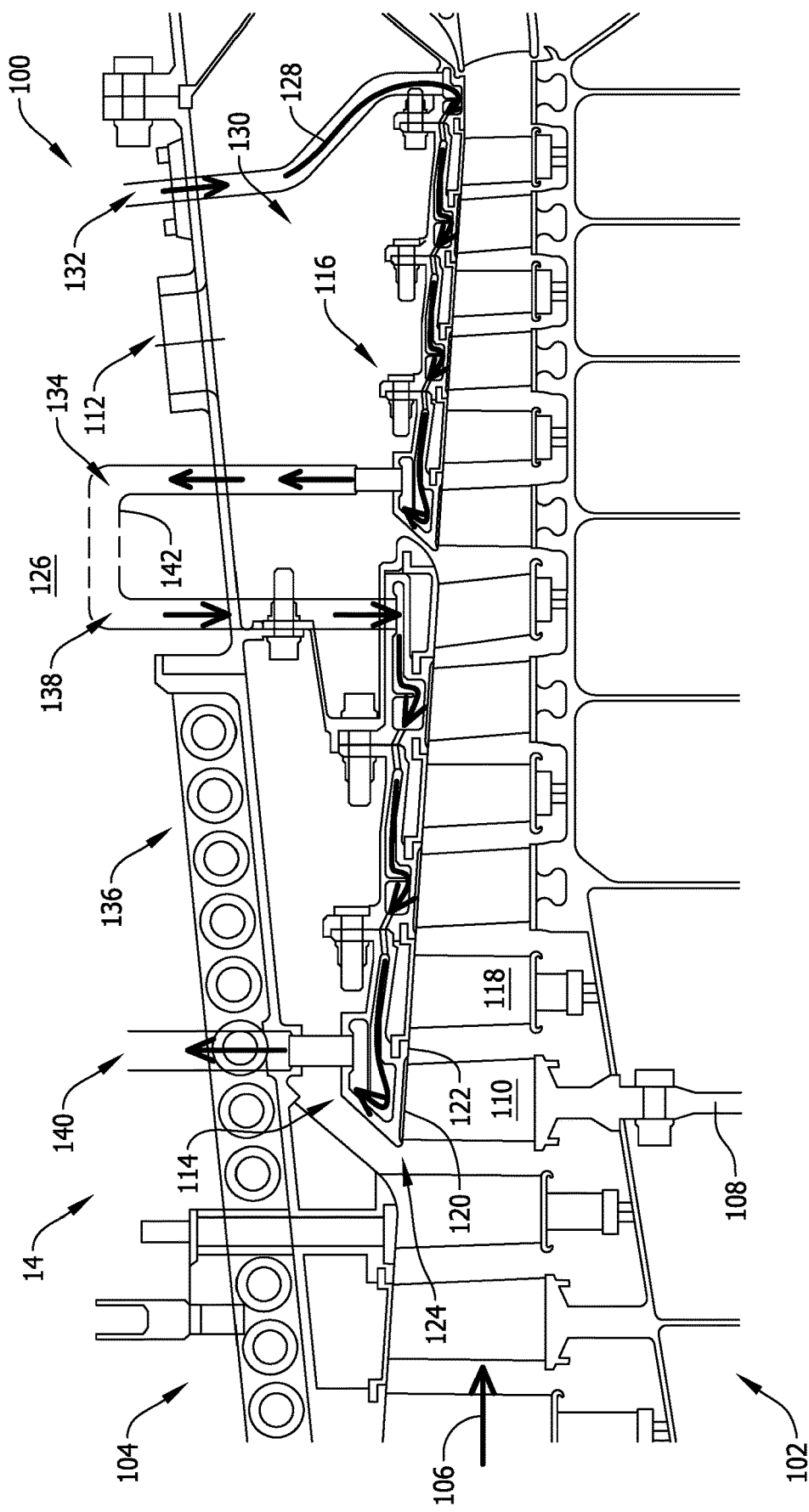
FIG. 2 is a cross-sectional view of an exemplary compressor that may be used with the gas turbine engine shown in FIG. 1.

FIG. 2 is a cross-sectional view of compressor 14 and an exemplary compressor clearance control system 100 that may be used with gas turbine engine 10. In the exemplary embodiment illustrated in FIG. 2, compressor 14 is a high pressure compressor. Compressor 14 includes a rotating assembly 102 and a stationary assembly 104 that are coupled together to define a primary flowpath 106 through compressor 14. Specifically, rotating assembly 102 includes a plurality of rotor disks 108 that each include a rotor blade 110 coupled thereto. Stationary assembly 104 includes a compressor casing 112 having a forward portion 114 and an aft portion 116. Stationary assembly 104 also includes a plurality of stator vanes 118 coupled to casing 112. Compressor 14 includes a plurality of stages, and each stage includes a row of rotor blades 110 and a row of stator vanes 118. In this arrangement, primary flowpath 106 includes a plurality of interdigitated stator vanes 118 and rotor blades 110. In the exemplary embodiment, rotor blades 110 each include a tip portion 120 positioned proximate a radially inner surface 122 of casing 112 such that a gap 124 is defined therebetween. As described herein, clearance control system 100 facilitates minimizing the size of gap 124 to improve the efficiency of operation of gas turbine engine 10.

In the exemplary embodiment, compressor clearance control system 100 includes a cooling air source 126 from which a flow of cooling air is extracted and channeled along a flowpath 128 defined through compressor casing 112. In one embodiment, cooling air source 126 is bypass air 52 from bypass duct 40. In another embodiment, cooling air source 126 is fan air 48 from fan assembly 12. Generally, cooling air source is any air source from outside core 13 that provides low temperature, low pressure air to clearance control system 100. The use of such air in clearance control system 100 minimizes the effect of removing a portion of the air from other engine 10 systems and therefore minimizes the effect on engine 10 performance.

In the exemplary embodiment, flowpath 128 includes a first circuit 130 that channels cooling air through aft portion 116 of casing 112. First circuit 130 includes an inlet 132 coupled in flow communication with air source 126 that receives cooling air from source 126 and channels the cooling air through aft portion 116. First circuit 130 also includes an outlet 134 coupled in flow communication with air source 126 that exhausts the cooling airflow from within aft portion 116 back to cooling air source 126. As such, first circuit 130 of flowpath 128 defines a closed loop system within compressor 14. In the exemplary embodiment, inlet 132 is positioned downstream from outlet 134, with respect to the direction of primary flowpath 106, such that clearance control system 100 channels cooling air along cooling flowpath 128 in a direction opposite that of primary flowpath 106. Such a configuration facilitates channeling cooling air through aft stages of aft portion 116 first since those are the hottest and the cooling air will increase in temperature as it flows through casing 112. Alternatively, inlet 132 is positioned upstream of outlet 134 such that clearance control system 100 channels cooling air along cooling flowpath 128 in a the same downstream direction as primary flowpath 106.

Similarly, in the exemplary embodiment, flowpath 128 includes a second circuit 136 that channels cooling air through forward portion 114 of casing 112. Second circuit 136 includes an inlet 138 coupled in flow communication with air source 126 that receives cooling air from source 126 and channels the cooling air through forward portion 114. Second circuit 136 also includes an outlet 140 coupled in flow communication with air source 126 that exhausts the cooling airflow from within forward portion 114 back to cooling air source 126. As such, second circuit 136 of flowpath 128 also defines a closed loop system within compressor 14. In the exemplary embodiment, inlet 138 is positioned downstream from outlet 140, with respect to the direction of primary flowpath 106, such that clearance control system 100 channels cooling air along cooling flowpath 128 in a direction opposite that of primary flowpath 106. Such a configuration facilitates channeling cooling air through aft stages of forward portion 114 first since those are the hottest and the cooling air will increase in temperature as it flows through casing 112. Alternatively, inlet 138 is positioned upstream of outlet 140 such that clearance control system 100 channels cooling air along cooling flowpath 128 in a the same downstream direction as primary flowpath 106.

As described above, each of first circuit 130 and second circuit 136 includes their own independent inlets 132,138 and outlets 134,140 such that circuits 130 and 136 are independent closed loop circuits. In another embodiment, clearance control system 100 includes a duct 142 (shown in broken lines) that couples outlet 134 of first circuit 130 with inlet 138 of second circuit 136 such that circuits 130 and 136 form a single continuous closed loop flowpath 128.

Figure 3:
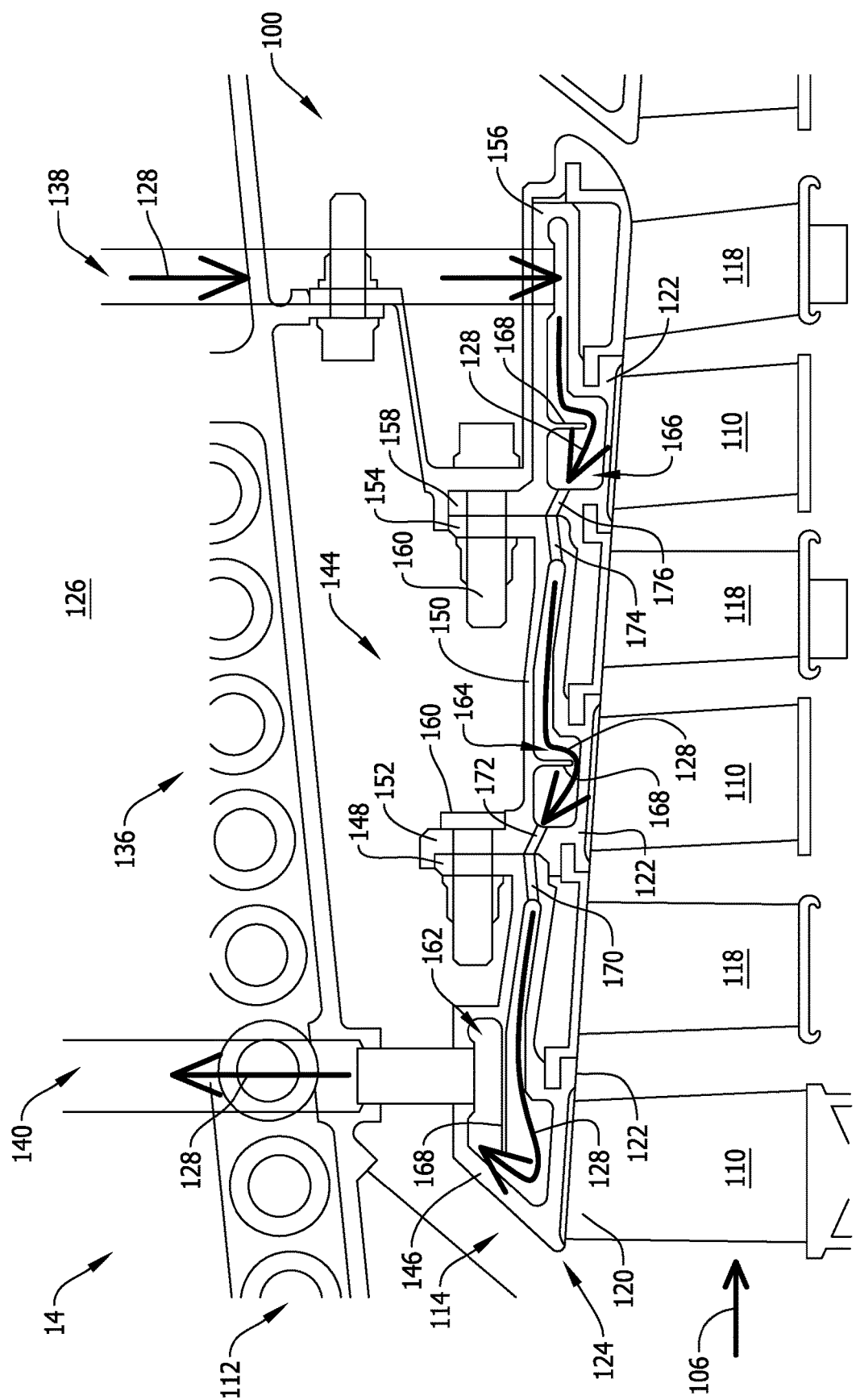
FIG. 3 is an enlarged view of a forward portion of the compressor shown in FIG. 2 illustrating a second circuit of an exemplary compressor clearance control system.

FIG. 3 is an enlarged view of forward portion 114 of compressor casing 112 illustrating cooling air flowpath second circuit 136 of compressor clearance control system 100. In the exemplary embodiment, forward portion 114 includes a plurality of rings 144 coupled to one another. More specifically, forward portion 114 includes a first ring 146 including an aft flange 148, a second ring 150 including a forward flange 152 and an aft flange 154, and a third ring 156 including a forward flange 158. In the exemplary embodiment, aft flange 148 of first ring 146 is coupled to forward flange 152 of adjacent second ring 150 via inserting a fastener 160 through aligned openings (not shown) defined in aft flange 148 and forward flange 152. Similarly, aft flange 154 of second ring 150 is coupled to forward flange 158 of adjacent third ring 156 via inserting a fastener 160 through aligned openings (not shown) defined in aft flange 154 and forward flange 158. Although FIG. 3 illustrates forward portion 114 as including three rings 144, forward portion 114 includes any number of rings 144 that facilitates operation of clearance control system 100 as described herein.

In the exemplary embodiment, first ring 146 includes a first cavity 162, second ring 150 includes a second cavity 164, and third ring 156 includes a third cavity 166. Cavities 162, 164, and 166 are defined in respective rings 146, 150, and 156 proximate radially inner surface 122 of casing 112 and combine to form a portion of flowpath 128 through casing 112. Each cavity 162, 164, and 166 includes at least one flow disruption feature 168 that forms a tortuous path within cavities 162, 164, and 166 such that the cooling air flows along flowpath 128 within each cavity 162, 164, and 166 for a predetermined amount of time to optimize cooling of each ring 146, 150, and 156 of forward portion 114.

In the exemplary embodiment, first ring 146 includes a first plurality of circumferentially-spaced inlets 170, second ring 150 includes a first plurality of circumferentially-spaced outlets 172 and a second plurality of circumferentially-spaced inlets 174, and third ring 156 includes a second plurality of circumferentially-spaced outlets 176. Inlets 170 are coupled in flow communication with cavity 162 of first ring 146. Similarly, outlets 176 are coupled in flow communication with cavity 166 of third ring 156. Inlets 174 and outlets 172 are coupled in flow communication with and positioned opposite of cavity 164 of second ring 150. In the exemplary embodiment, each inlet 170 is also coupled in flow communication with a corresponding outlet 172 such that cooling air within cavity 164 of second ring 150 is channeled to cavity 162 of first ring 146. Similarly, each inlet 174 is also coupled in flow communication with a corresponding outlet 176 such that cooling air within cavity 166 of third ring 156 is channeled to cavity 164 of second ring 150. As such, cooling air is channeled from source 126 into inlet 138 and then through each of cavity 166, outlets 176, inlets 174, cavity 164, outlets 172, inlets 170, and cavity 162 in series along second circuit 136 of flowpath 128 before being exhausted back to source 126 via outlet 140.

In the exemplary embodiment, rings 144 of forward portion 114 are manufactured via additive manufacturing, also referred to as 3D printing. More specifically, additive manufacturing enables cavities 162, 164, and 166 along with inlets 170 and 174 and outlets 172 and 176 to be formed within casing 112. Alternatively, rings 144 are manufactured by any manufacturing method, such as but not limited to, casting, machining, and EDM.

Figure 4:
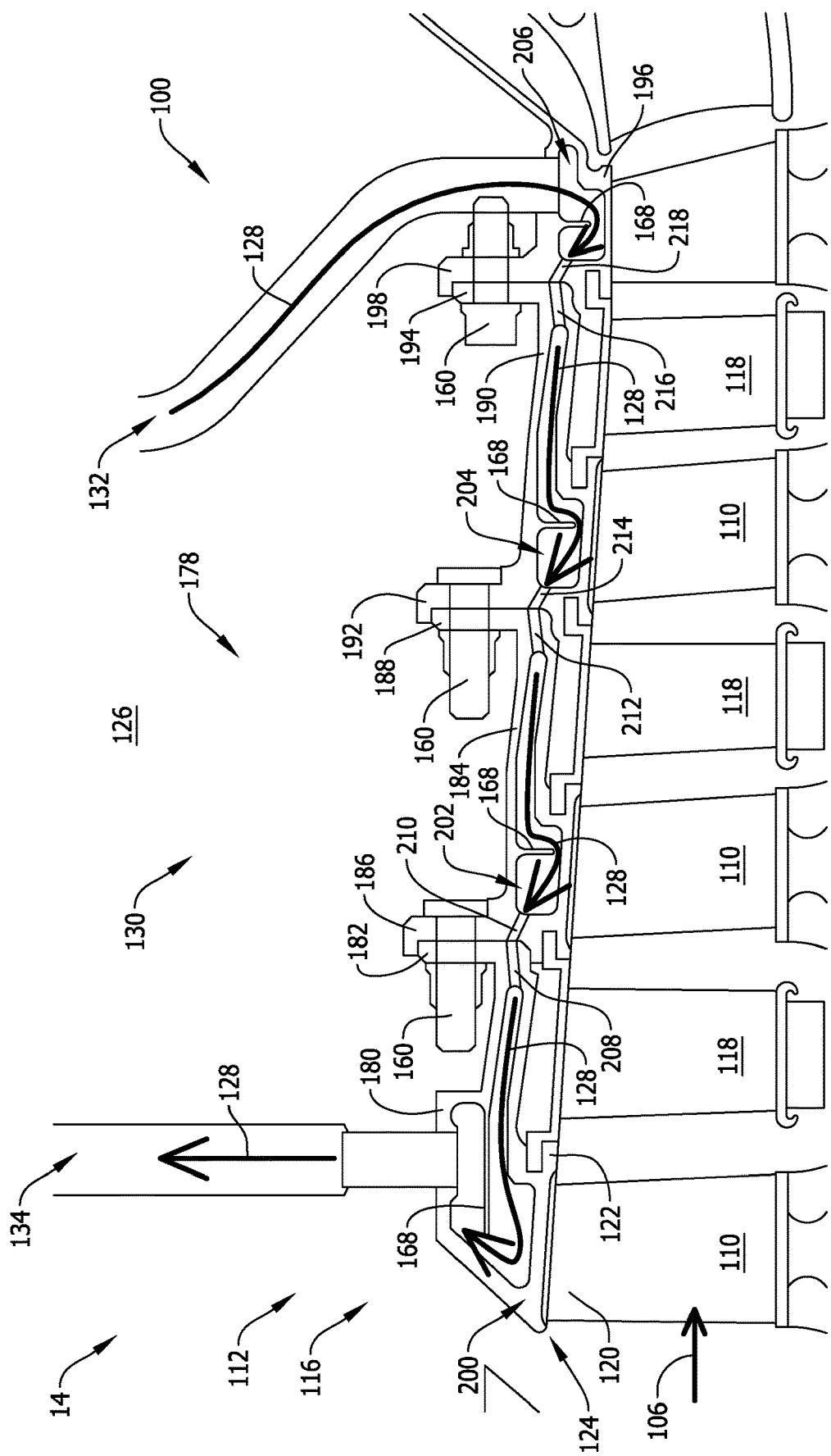
FIG. 4 is an enlarged view of an aft portion of the compressor shown in FIG. 2 illustrating a first circuit of an exemplary compressor clearance control system.

FIG. 4 is an enlarged view of aft portion 116 of compressor casing 112 illustrating cooling air flowpath first circuit 130 of compressor clearance control system 100. In the exemplary embodiment, aft portion 116 includes a plurality of rings 178 coupled to one another. More specifically, aft portion 116 includes a first ring 180 including an aft flange 182, a second ring 184 including a forward flange 186 and an aft flange 188, a third ring 190 including a forward flange 192 and an aft flange 194, and a fourth ring 196 including a forward flange 198. In the exemplary embodiment, aft flange 182 of first ring 180 is coupled to forward flange 186 of adjacent second ring 184 via inserting a fastener 160 through aligned openings (not shown) defined in aft flange 182 and forward flange 186. Similarly, aft flange 188 of second ring 184 is coupled to forward flange 192 of adjacent third ring 190 via inserting a fastener 160 through aligned openings (not shown) defined in aft flange 188 and forward flange 192. Still similarly, aft flange 194 of third ring 190 is coupled to forward flange 198 of adjacent fourth ring 196 via inserting a fastener 160 through aligned openings (not shown) defined in aft flange 194 and forward flange 198. Although FIG. 4 illustrates aft portion 116 as including four rings 178, aft portion 116 includes any number of rings 178 that facilitates operation of clearance control system 100 as described herein.

In the exemplary embodiment, first ring 180 includes a first cavity 200, second ring 184 includes a second cavity 202, third ring 190 includes a third cavity 204, and fourth ring 196 includes a fourth cavity 206. Cavities 200, 202, 204, and 206 are defined in respective rings 180, 184, 190, and 196 proximate radially inner surface 122 of casing 112 and combine to form a portion of flowpath 128 through casing 112. Each cavity 200, 202, 204, and 206 includes at least one flow disruption feature 168 that forms a tortuous path within cavities 200, 202, 204, and 206 such that the cooling air flows along flowpath 128 within each cavity 200, 202, 204, and 206 for a predetermined amount of time to optimize cooling of each ring 180, 184, 190, and 196 of aft portion 116.

In the exemplary embodiment, first ring 180 includes a first plurality of circumferentially-spaced inlets 208; second ring 184 includes a first plurality of circumferentially-spaced outlets 210 and a second plurality of circumferentially-spaced inlets 212. Similarly, third ring 190 includes a second plurality of circumferentially-spaced outlets 214 and a third plurality of circumferentially-spaced inlets 216, while fourth ring 196 includes a third plurality of circumferentially-spaced outlets 218. Inlets 208 are coupled in flow communication with cavity 200 of first ring 180 and outlets 218 are coupled in flow communication with cavity 206 of fourth ring 196. Inlets 212 and outlets 210 are coupled in flow communication with and positioned opposite of cavity 202 of second ring 184, and inlets 216 and outlets 214 are coupled in flow communication with and positioned opposite of cavity 204 of third ring 190. In the exemplary embodiment, each inlet 208 is also coupled in flow communication with a corresponding outlet 210 such that cooling air within cavity 202 of second ring 184 is channeled to cavity 200 of first ring 180. Similarly, each inlet 212 is also coupled in flow communication with a corresponding outlet 214 of third ring 190 such that cooling air within cavity 204 of third ring 190 is channeled to cavity 202 of second ring 184. Also, each inlet 216 is also coupled in flow communication with a corresponding outlet 218 of fourth ring 196 such that cooling air within cavity 206 of fourth ring 196 is channeled to cavity 204 of third ring 190 As such, cooling air is channeled from source 126 into inlet 132 and then through each of cavity 206, outlets 218, inlets 216, cavity 204, outlets 214, inlets 212, cavity 202, outlets 210, inlets 208, and cavity 200 in series along first circuit 130 of flowpath 128 before being exhausted back to source 126 via outlet 134.

In the exemplary embodiment, rings 178 of aft portion 116 are also manufactured via additive manufacturing, also referred to as 3D printing. More specifically, additive manufacturing enables cavities 200, 202, 204, and 206 along with inlets 208, 212, and 216 and outlets 210, 214, and 218 to be formed within casing 112.

In operation, gap 124 is defined between rotor blade tip 120 and radially inner surface 122 of compressor casing 112. As described herein, the size of gap 124 is minimized to increase the efficiency of engine 10. As air travels along primary flowpath 106 and increases in pressure, it also increases in temperature. At least a portion of the thermal energy is transferred to compressor casing 112, which may cause casing 112 to undergo thermal expansion. If no action is taken, the thermal expansion of casing 112 results in an increase in the size of gap 124 between rotor blade tip 120 and radially inner surface 122, which reduces the efficiency of engine 10.

In the exemplary embodiment, clearance control system 100 channels a cooling airflow along flowpath 128 defined in a radially inner portion of casing 112 to facilitate cooling casing 112 and minimizing or preventing thermal expansion, which increases the efficiency of engine 10. The cooling air is harvested from source 126 of low temperature, low pressure air, channeled through casing 112, and then exhausted back to source 126 to define a closed loop system within compressor 14. The use of such air, rather than higher pressure bleed air, for example, has a reduced effect on the efficiency of the engine 10.

The exemplary system and methods described herein overcome at least some disadvantages of known compressor casings. Moreover, the systems and methods described herein include a cooling air flowpath defined in a radially inward portion of the compressor casing. More specifically, the flowpath channels low temperature, low pressure air through the compressor casing to cool the portions of the casing proximate the relatively high temperature airflow within the primary flowpath. As such, thermal expansion of the compressor casing is reduced or prevented and the size of the gap defined between the rotor blade tip and the radially inner surface of the casing is controlled to a minimum.

A technical effect of the above described compressor clearance control system is minimization of the gap, which leads to an increase in overall engine efficiency. Furthermore, the clearance control system uses low temperature, low pressure air from the fan assembly and/or the bypass duct to channel through the casing. Since the system is close, leakage into and out of the cooling circuit are minimized. This enables the use of low temperature, low pressure cooling air. By not using bleed air from the primary flowpath, comparatively more air is channeled through the primary flowpath and the efficiency of the engine is increased.

Exemplary embodiments of compressor clearance control systems are described above in detail. The compressor clearance control systems, and methods of operating such systems and devices are not limited to the specific embodiments described herein, but rather, components of systems and/or steps of the methods may be utilized independently and separately from other components and/or steps described herein. For example, the methods may also be used in combination with other systems requiring cooling systems, and are not limited to practice with only the turbine engine system and methods as described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A compressor clearance control system comprising:
    a compressor comprising a rotating assembly and a compressor casing surrounding the rotating assembly, the compressor casing and the rotating assembly defining a primary flowpath therebetween; and
    a bypass duct surrounding the compressor casing;
    wherein said compressor casing comprises one or more cavities defining at least a portion of a cooling air flowpath through said compressor casing, said cooling air flowpath comprising a first inlet configured to receive cooling air from said bypass duct and a first outlet configured to exhaust the cooling air back to the bypass duct, wherein said cooling air flowpath channels cooling air in a first direction opposite a direction of said primary flowpath, the cooling air comprising bypass air from the bypass duct;
    wherein said compressor casing comprises an aft portion and a forward portion, and said cooling air flowpath comprises a first circuit flowing through said aft portion and a second circuit flowing through said forward portion, and
    wherein said first circuit comprises the first outlet coupled in flow communication with a second inlet of said second circuit.

2. The system of claim 1, wherein said compressor casing comprises a plurality of rings coupled to one another, and wherein respective ones of the plurality of rings define a corresponding portion of the one or more cavities.

3. The system of claim 2, wherein respective ones of the plurality of rings comprise one or more circumferentially-spaced inlets in flow communication with the corresponding portion of the one or more cavities, and one or more circumferentially-spaced outlets in flow communication with the corresponding portion of the one or more cavities, wherein adjacent ones of the plurality of rings comprise a corresponding circumferentially-spaced inlet coupled in flow communication with a corresponding circumferentially-spaced outlet.

4. The system of claim 3, wherein respective ones of the plurality of rings comprise a flow disruption feature that forms a tortuous flow path within the corresponding portion of the one or more cavities defined by the respective ones of the plurality of rings.

5. The system of claim 4, wherein the cooling air flows through the corresponding portion of the one or more cavities defined by the respective ones of the plurality of rings for a predetermined amount of time selected to impart a desired amount of cooling at respective ones of the plurality of rings.

6. The system of claim 3, wherein the plurality of rings are formed by additive manufacturing, the additive manufacturing comprising forming the corresponding portion of the one or more cavities, the one or more circumferentially-spaced inlets, and the one or more circumferentially-spaced outlets.

7. The system of claim 1, wherein the first circuit comprises the first inlet and the first outlet that are in flow communication with said bypass duct and the second circuit comprises the second inlet and a second outlet that are in flow communication with said bypass duct.

8. The system of claim 1, wherein the first inlet is positioned axially downstream from the first outlet.

9. The system of claim 1, wherein said cooling air flowpath is defined in part by a radially inner portion of said compressor casing proximate to the primary flowpath.

10. The system of claim 1, wherein the one or more cavities comprises a first cavity, and wherein the first cavity comprises a flow disruption feature that forms a tortuous flow path within the first cavity.

11. A gas turbine engine comprising:
a rotating component;
a stationary component positioned radially outward from said rotating component to define a primary flowpath therebetween; and
a bypass duct surrounding the stationary component;
wherein said compressor casing comprises one or more cavities defining at least a portion of a cooling air flowpath through said stationary component, wherein said cooling air flowpath is positioned proximate said primary flowpath, said cooling air flowpath configured to channel cooling air from said bypass duct therethrough with said cooling air flowing in a first direction opposite a direction of said primary flowpath to facilitate cooling said stationary component and to exhaust said cooling air back to said bypass duct, the cooling air comprising bypass air from the bypass duct;
wherein said compressor casing comprises an aft portion and a forward portion, and said cooling air flowpath comprises a first circuit flowing through said aft portion and a second circuit flowing through said forward portion; and
wherein said stationary component comprises an aft portion and a forward portion, and said cooling air flowpath comprises a first circuit flowing through said aft portion and a second circuit flowing through said forward portion, and wherein said first circuit comprises a first outlet coupled in flow communication with a second inlet of said second circuit.

12. The gas turbine engine of claim 11, wherein said cooling air flowpath comprises a first inlet configured to receive cooling air from said bypass duct and the first outlet configured to exhaust the cooling air to said bypass duct.

13. The gas turbine engine of claim 11, wherein said stationary component comprises a plurality of rings coupled to one another, and wherein respective ones of the plurality of rings defines a corresponding portion of the one or more cavities, and wherein respective ones of the plurality of rings comprise one or more circumferentially-spaced inlets in flow communication with the corresponding portion of the one or more cavities, and one or more circumferentially-spaced outlets in flow communication with the corresponding portion of the one or more cavities, wherein adjacent ones of the plurality of rings comprise a corresponding circumferentially-spaced inlet coupled in flow communication with a corresponding circumferentially-spaced outlet.

14. The gas turbine engine of claim 13, wherein respective ones of the plurality of rings comprise a flow disruption feature that forms a tortuous flow path within the corresponding portion of the one or more cavities defined by the respective ones of the plurality of rings; and
wherein the cooling air flows through the corresponding portion of the one or more cavities defined by the respective ones of the plurality of rings for a predetermined amount of time selected to impart a desired amount of cooling at respective ones of the plurality of rings.

15. The gas turbine engine of claim 13, wherein the plurality of rings are formed by additive manufacturing, the additive manufacturing comprising forming the corresponding portion of the one or more cavities, the one or more circumferentially-spaced inlets, and the one or more circumferentially-spaced outlets.

16. The gas turbine engine of claim 11, wherein the first circuit comprises a first inlet and the first outlet that are in flow communication with said bypass duct; and wherein the second circuit comprises the second inlet and a second outlet that are in flow communication with said bypass duct.

17. A method of assembling a gas turbine engine, said method comprising:
coupling a stationary component radially outward from a rotating component, the stationary component and the rotating component defining a primary flowpath therebetween, wherein said stationary component comprises one or more cavities defining at least a portion of a cooling air flowpath through said stationary component; and
coupling a bypass duct surrounding the stationary component, with an inlet of the cooling air flowpath in flow communication with the bypass duct to channel cooling air from said bypass duct through the cooling air flowpath to facilitate cooling the stationary component, and an outlet of the cooling air flowpath in flow communication with the bypass duct to exhaust said cooling air back to said bypass duct, wherein the cooling air flowpath channels cooling air in a first direction opposite a direction of said primary flowpath, the cooling air comprising bypass air from the bypass duct;
wherein said stationary component comprises an aft portion and a forward portion, and said cooling air flowpath comprises a first circuit flowing through said aft portion and a second circuit flowing through said forward portion; and wherein said first circuit comprises an outlet coupled in flow communication with an inlet of said second circuit.

18. The method of claim 17, wherein the stationary component comprises a plurality of rings coupled to one another, respective ones of the plurality of rings defining a corresponding portion of the one or more cavities, and wherein the plurality of rings are formed via additive manufacturing.

19. The method of claim 18, wherein coupling the stationary component comprises coupling the plurality of rings radially outward from the rotating component;
wherein respective ones of the plurality of rings comprise one or more circumferentially-spaced inlets in flow communication with the corresponding portion of the one or more cavities, and one or more circumferentially-spaced outlets in flow communication with the corresponding portion of the one or more cavities.

20. The method of claim 19, wherein coupling the plurality of rings comprises coupling adjacent ones of the plurality of rings with one another, such that a first one of the plurality of rings adjacently coupled to a second one of the plurality of rings comprise a circumferentially-spaced inlet of the first one of one of the plurality of rings in flow communication with a corresponding circumferentially-spaced outlet of the second one of the plurality of rings, wherein the one or more circumferentially-spaced inlets, the one or more circumferentially-spaced outlets, and the one or more cavities, of the plurality of rings together define at least a portion of the cooling air flowpath.

\* \* \* \* \*